United States Patent [19]

Pryor et al.

[11] Patent Number: 4,479,702

[45] Date of Patent: Oct. 30, 1984

[54] METHOD AND APPARATUS FOR ASSEMBLING A COMPACT MULTI-CONDUCTOR OPTICAL FIBER COMMUNICATION CABLE

[75] Inventors: Michael J. Pryor, Woodbridge; Joseph Winter, New Haven, both of Conn.

[73] Assignee: Olin Corporation, New Haven, Conn.

[21] Appl. No.: 395,443

[22] Filed: Jul. 6, 1982

[51] Int. Cl.³ .............................................. G02B 5/16
[52] U.S. Cl. ............................... 350/96.23; 350/96.20
[58] Field of Search ........................... 350/96.23, 96.20

[56] References Cited

U.S. PATENT DOCUMENTS

| | | |
|---|---|---|
| 3,992,977 | 11/1976 | Winter et al. |
| 3,995,878 | 5/1976 | Nowak . |
| 4,037,445 | 7/1977 | Winter et al. |
| 4,118,594 | 10/1978 | Arnaud . |
| 4,147,089 | 4/1979 | Winter et al. |
| 4,147,090 | 4/1979 | Winter et al. |
| 4,201,607 | 5/1980 | Rautenberg et al. |
| 4,212,097 | 7/1980 | Portinari et al. |
| 4,232,935 | 11/1980 | Rohner et al. |
| 4,239,336 | 12/1980 | Parfree et al. |
| 4,257,675 | 3/1981 | Nakagome et al. |
| 4,278,835 | 7/1981 | Jackson . |
| 4,279,470 | 7/1981 | Portinari et al. |
| 4,288,144 | 9/1981 | Nakai et al. |
| 4,312,563 | 1/1982 | Mead et al. .......... 350/96.2 |

FOREIGN PATENT DOCUMENTS

| | | | |
|---|---|---|---|
| 2523738 | 12/1975 | Fed. Rep. of Germany ... | 350/96.23 |
| 2641139 | 3/1977 | Fed. Rep. of Germany . | |
| 1172272 | 11/1969 | United Kingdom ............. | 350/96.23 |
| 2010528 | 6/1979 | United Kingdom ............. | 350/96.23 |

OTHER PUBLICATIONS

Begeman et al., Manufacturing Processes, John Wiley and Sons, Inc., 1957, pp. 283–285.
Wilkins et al., "An Electro-Optical Array Support Cable", presented at the Winter Annual Meeting, Nov. 16–20, 1980 of the ASME.
Wilkins et al., "Design and Performance of an Undersea, Single-Fiber Multi-Repeater, Full Duplex, Electro-Optical Data Link", International Telemetry.
*Understanding Copper Alloys, The Manufacture and Use of Copper and Copper Alloy Sheet and Strip*, ed. by J. Howard Mendenhall, Winchester Press, 1977, pp. 86–89.
"Standard Method of Test for Electrical Conductivity by Use of Eddy Currents", 1966 *Book of ASTM Standards* (Part 5), pp. 601–662.
"The Selection and Application of Wrought Copper and Copper Alloys", *Metals Handbook*, 8th Ed., vol. 1, 1961, pp. 960–962.
*Handbook of Chemistry and Physics*, ed. by C. D. Hodgman, 43 Ed., Chemical Rubber Publishing Co., 1662, pp. 3239–3240.
Conference, San Diego, California, Oct. 13–15, 1981.
Wilkins et al., "Guidelines to the Design of Optical Cables", presented at the Winter Annual Meeting, Dec. 2–7, 1979 of the ASME.
Wilkins et al., "How Small Can an Electro-Optical Transoceanic Cable Be?", International Telemetry Conference, San Diego, CA., Oct. 13–15, 1981.
Wilkins et al., "Recent Experience with Small, Undersea, Optical Cables", IEEE-Eascon, Oct. 1979, Washington, D.C.

*Primary Examiner*—William L. Sikes
*Assistant Examiner*—Akm E. Ullah
*Attorney, Agent, or Firm*—Barry L. Kelmachter; Paul Weinstein; Howard M. Cohn

[57] ABSTRACT

A method and apparatus for assembling an optical fiber communication cable is disclosed herein. The cable has a tubular core formed from a strip of composite material. The composite material has a first layer of high strength metal or metal alloy, a plurality of electrical conductors formed by a material having a conductivity in excess of 50% IACS, and an electrical insulating material separating the first layer and the electrical conductors. At least one optical fiber is located within the tubular core.

30 Claims, 9 Drawing Figures

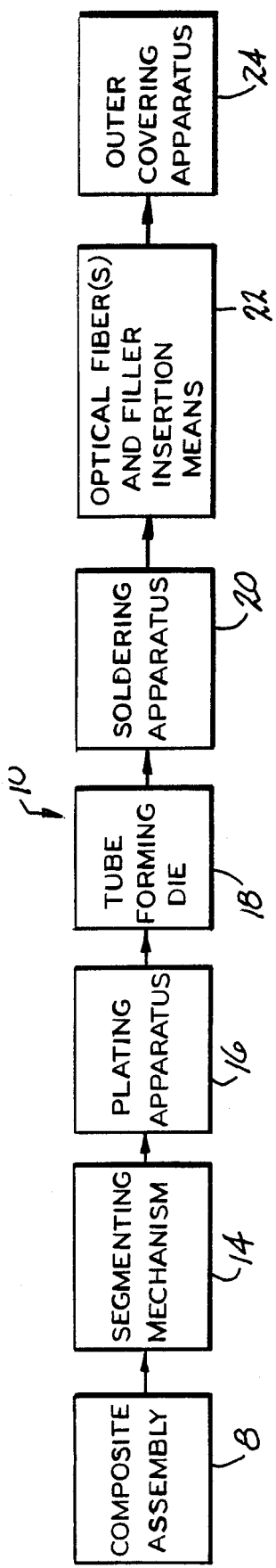
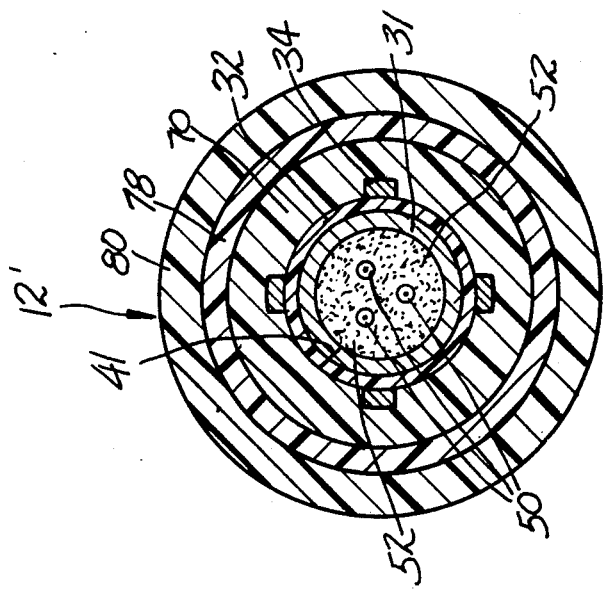
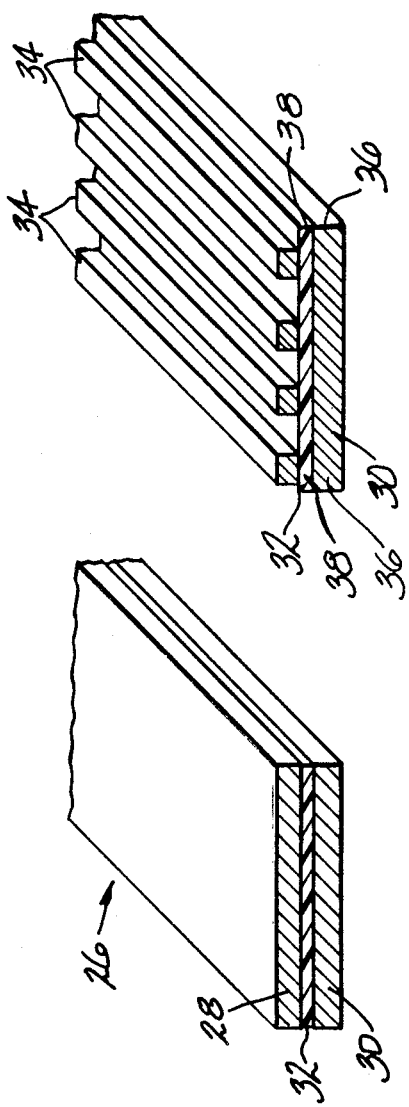

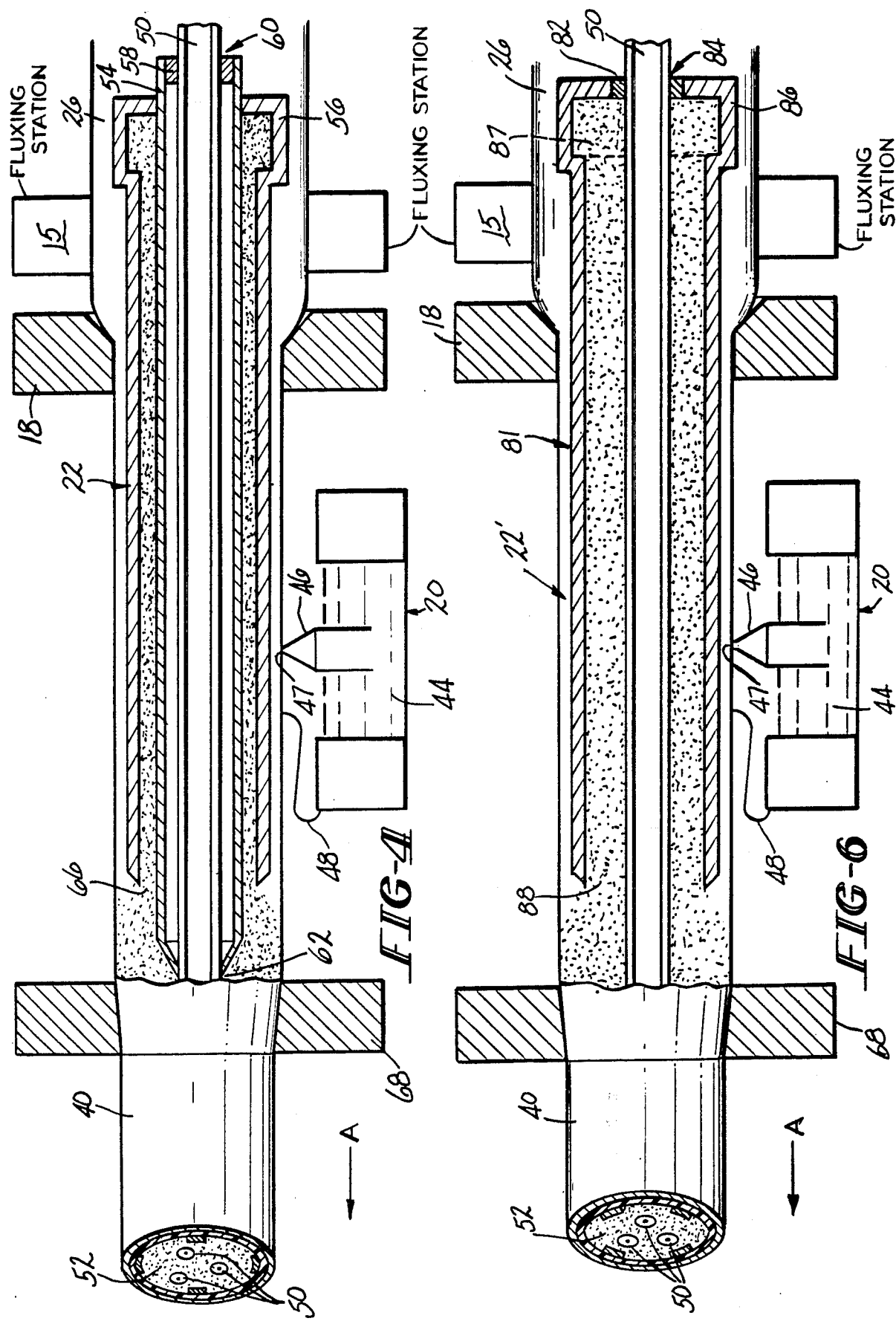

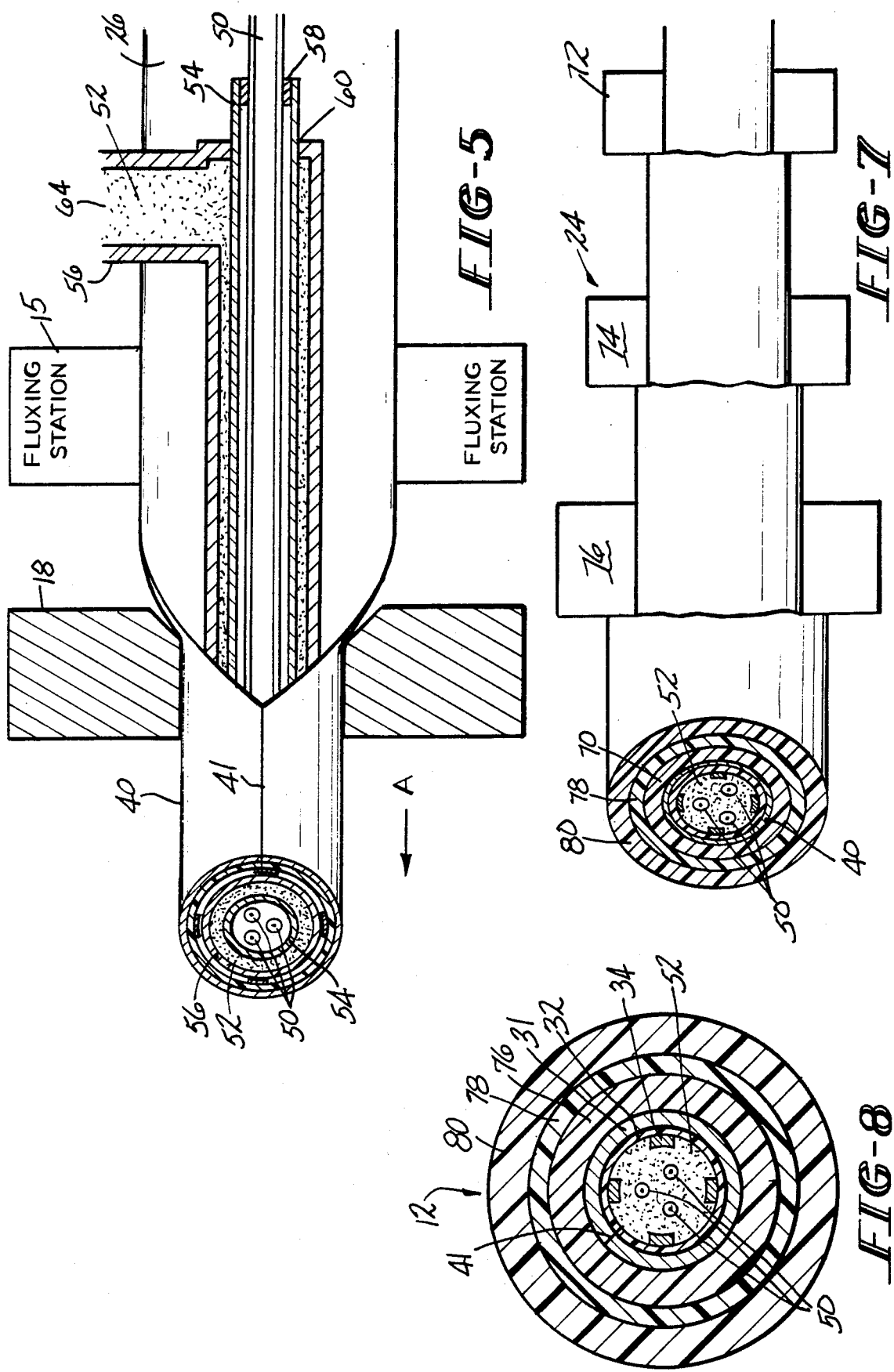

METHOD AND APPARATUS FOR ASSEMBLING A COMPACT MULTI-CONDUCTOR OPTICAL FIBER COMMUNICATION CABLE

The invention disclosed herein relates to an optical fiber communication cable and a method and apparatus for assembling such a cable. The cable produced by the instant invention has utility in both underground and undersea applications.

The advent of optical fibers for use in communication applications has permitted construction of relatively small diameter cables. Generally, an optical fiber communication cable is designed to provide all required electrical, optical, and physical functions within the smallest possible diameter. In addition, it is desirable that the cable be constructed to have a relatively long uninterrupted length and good flexibility characteristics. Furthermore, in undersea applications, the cable should be able to withstand such stresses as hydrostatic pressure, temperature, and sea action.

Classically, an optical fiber communication cable has one or more optical fibers contained within a conductive metallic sheath overlaid by insulation and armoring. The conductive metal sheath serves as a single electrical conductor. Typical optical cable constructions are those shown and discussed in U.S. Pat. Nos. 3,955,878 to Nowak, U.S. Pat. No. 4,201,607 to Rautenberg et al., U.S. Pat. No. 4,212,097 to Portinari et al., U.S. Pat. No. 4,278,835 to Jackson, U.S. Pat. No. 4,279,470 to Portinari et al., and U.S. Pat. No. 4,288,144 to Nakai et al., in "Guidelines to the Design of Optical Cables" by Wilkins, presented at the Winter Annual Meeting, Dec. 2-7, 1979 of the American Society of Mechanical Engineers, in "An Electro-Optical Array Support Cable" by Wilkins, presented at the Winter Annual Meeting, Nov. 16-20, 1980 of the American Society of Mechanical Engineers, in "Recent Experience with Small, Undersea Optical Cables" by Wilkins, IEEE-EASCON, October, 1979, Washington, D.C., in "How Small Can An Electro-Optical Transoceanic Cable Be?" by Wilkins, International Telemetry Society Conference, San Diego, Calif., Oct. 13-15, 1981 and in "Design and Performance of an Undersea, Single-Fiber, Multi-Repeater, Full Duplex, Electro-Optical Data Link", by Wilkins et al., International Telemetry Conference, San Diego, Calif., Oct. 13-15, 1981.

The fabrication of these optical fiber communication cables are frequently hampered by such problems as an inability to obtain extremely long uninterrupted lengths of assembled cable, kinking or breaking of the fibers during threading, and filling the tube with an appropriate filler while maintaining the fibers in reasonable separation. Various approaches for fabricating optical fiber communication cables are known in the art.

A first approach forms a metal tube, slits the metal tube, inserts one or more optical fibers and a void filling gel into the tube through the slit and then seals the slit. Thereafter, the tube is surrounded by a dielectric layer, a loadbearing section and an outer jacket. Illustrative of this approach is "An Electro-Optical Array Support Cable" by Wilkins. A similar approach is shown in U.S. Pat. Nos. 4,212,097 and 4,279,470, both to Portinari et al.

A second approach is illustrated in co-pending U.S. patent application Ser. No. 272,154, filed June 10, 1981 to Winter et al., now abandoned. In the Winter et al. application, the cable core is assembled by pulling a strip of metal or metal alloy through a die to form a tubular conductor and simultaneously inserting at least one optical fiber and a cushioning material into the forming tubular conductor. Thereafter, in a first embodiment, the tubular conductor seam is welded or soldered to provide the desired degree of hermeticity. In a second embodiment, the tubular conductor is encased within a locking sheath.

Yet another approach for fabricating optical fiber communication cables is illustrated in co-pending U.S. patent application Ser. No. 324,242, filed Nov. 23, 1981 to Winter et al., now abandoned. In this approach, a tubular conductor is formed from a strip of metal or metal alloy and its seam is sealed. After the seam has been sealed, a cushioning material is injected into the tubular conductor. Preferably, just downstream of or simultaneous with the cushioning material being injected into the tubular conductor, at least one optical fiber is inserted into the tubular conductor. The cable may then be completed by surrounding the tubular conductor with a dielectric layer, a loadbearing layer, and an outer covering. Both Winter et al. approaches lend themselves to forming compact optical fiber communication cables.

In addition to the classical optical fiber communication cable, there is a series of hybrid fiber optical communication cables that require more than one current lead. For example, additional electrical conductors may be required to supply power to motors, generators, detectors, or other multiple loads. Some of these hybrid cables are formed by including a series of insulated copper cables within a metal sheath and interspersing optical fiber components between the insulated copper cables. Such a configuration is not only difficult to manufacture but is also inordinately bulky because of the current carrying requirements of the copper wires or cables.

Other types of hybrid cables are illustrated in U.S. Pat. Nos. 4,118,594 to Arnaud, U.S. Pat. No. 4,232,935 to Rohner et al., 4,239,336 to Parfree et al. and U.S. Pat. No. 4,257,675 to Nakagome et al. The Arnaud patent discloses a coaxial cable including an inner conductor and a plurality of spaced apart optical fibers located within a tubular conductor.

U.S. Pat. No. 4,232,935 to Rohner et al. discloses a cable having a plurality of optical waveguides located within a corrugated tubular member which can be used as a conductor. Rohner et al. also disclose that additional conductors require for power supply may be introduced into the tubular member. U.S. Pat. No. 4,257,675 to Nakagome et al. discloses a cable having a plurality of optical fibers, a thin, cylindrical pressure resisting sheath and a reinforcing member. Nakagome et al. suggest that one or more of the optical fibers could be replaced by power feeding conductors or tension members and that the reinforcing member or pressure resisting layer may also be used as a power feeding conductor.

The Rohner et al. and Nakagome et al. patents also illustrate another approach for forming an optical fiber communication cable. This approach rolls an electrical conductor tube from a flat-tape stock of copper material. Just before tube closure, the optical fibers and void filler or pressure buffer layer are inserted into the tube channel. The tube is then forced shut and permanently welded or soldered. Additional layers consisting of synthetic materials and containing high tensile strength materials are used to cover the conductor tube.

Another type of hybrid cable is illustrated by the Parfree et al. patent. In this cable, optical fibers are located within a split aluminum tube. A copper tube made from copper tape is formed around the aluminum tube. The aluminum and copper tubes are separated by a strength member. Parfree et al. suggest that if a non-metallic strength member is used, the aluminum and copper tubes could be used as separate conductors.

In the past, hybrid optical fiber cable constructions have tended to be bulky and difficult to fabricate. The present invention describes a much more compact construction for a hybrid optical fiber cable and an improved method and apparatus for assembling such a cable.

In accordance with the instant invention, the cable is formed using a composite material having first and second layers of metallic material separated by a layer of flexible dielectric material. A first one of the metallic layers preferably comprises an electrically conductive material, such as copper or copper alloy, having a conductivity in excess of 50% International Annealed Copper Standard, hereinafter IACS. The second metallic layer preferably comprises a high strength material such as stainless steel. The second layer forms a high strength sheath whose function is primarily one of armoring the cable construction, although it may also form part of the electrical system.

Prior to fabrication into a tubular cable core, the first layer is segmented into a plurality of distinct longitudinally extending strips. These strips form a plurality of electrical conductors. In segmenting the layer into strips, the strips are shaped so as to enable formation of a compact cable core.

In accordance with the instant invention, the method of assembly first comprises pulling the strip of composite material through a station for applying a flux to the edges of the composite material and then through a die for forming a tubular cable core construction having a substantially square and tight seam. Thereafter, the tubular cable core is passed to a station for sealing the seam. Depending upon the manner in which the core is to be sealed, the edges of the composite material forming the seam may be subjected to a plating operation prior to the flux application. For example, if it is desired to join together the edges of both the high strength and dielectric layers, the edges of both layers may be plated using an electroless plating system. If it is desired to join together only the edges of the high strength layer or to seal the core using a non-metallic joining technique, the edge plating operation may be omitted.

After the tubular core has been sealed, a cushioning material such as a dielectric filler is injected into the tubular cable core. Preferably just downstream of or simultaneous with the cushioning material being injected into the tubular cable core, at least one optical fiber is inserted into the tubular cable core. In a preferred manner, each fiber is introduced into the core without substantially any back tension so that it remains unconstrained until it contacts the cushioning material. Since each fiber is unconstrained during that portion of the process where the composite material is formed into a tube, each fiber is under substantially zero tension at the same time that the core is near maximum elastic tension. By doing this, it is possible to put each fiber in static compression after unloading. By having each fiber in static compression, kinking of the fiber should be avoided even if the metallic sheath portion undergoes an increment of plastic strain equal to the net static compression.

Thereafter, the core may be surrounded by one or more additional layers such as a dielectric layer, a load-bearing layer, and/or an outer covering. The number of additional layers surrounding the core would depend upon the ultimate use of the cable.

In forming the tubular cable core in accordance with the instant invention, the plurality of conductors may be disposed radially around either the inner or outer portion of the sheath portion of the tubular cable core. If disposed about the sheath outer portion, the conductors should be surrounded by a dielectric layer.

In an alternative embodiment of the instant invention, the first layer of metallic material is formed by bonding a plurality of shaped strips of metal or metal alloy to the insulating layer. By forming the composite material in this manner, the segmenting operation of the prior embodiment may be eliminated. The composite material formed in this alternative manner may be fabricated into an optical fiber communication cable using the previously described method of assembly.

The cable produced by the method and apparatus of the instant invention has a relatively small diameter and good flexibility characteristics. This cable is capable of resisting sea action and of withstanding the pressures and temperatures associated with undersea applications. In addition, the cable produced by the method and apparatus of the instant invention may be level wound on a storage reel, may be stored on a reel with a minimum total volume and may have relatively long uninterrupted lengths.

It is an object of the present invention to provide a method and apparatus for assembling an optical fiber communication cable having a relatively small diameter.

It is a further object of the present invention to provide a method and apparatus as above for assembling an optical fiber communication cable having a plurality of conductors for supplying power to a plurality of loads.

These and other objects will become more apparent from the following description and drawings.

Embodiments of the method and apparatus for assembling the optical fiber communication cable and the cable produced by the instant invention are shown in the drawings wherein like numerals depict like parts.

FIG. 1 is a schematic representation of an apparatus for assembling an optical fiber communication cable in accordance with the instant invention.

FIG. 2 is a schematic representation in cross section of a composite material used to form the optical fiber communication cable core of the instant invention.

FIG. 3 is a schematic representation in cross section of the composite material used to form the optical fiber communication cable of the instant invention after segmenting.

FIG. 4 is a schematic representation in partial cross section of a side view of an apparatus used to assemble the optical fiber communication cable core.

FIG. 5 is a schematic representation in partial cross section of a bottom view of a portion of the apparatus of FIG. 4.

FIG. 6 is a schematic representation in partial cross section of a side view of an alternative embodiment of an apparatus used to assemble the optical fiber communication core.

FIG. 7 is a schematic representation in partial cross section of the apparatus used to fabricate the outer layers of the optical fiber communication cable.

FIG. 8 is a schematic representation in cross section of a cable produced in accordance with the instant invention.

FIG. 9 is a schematic representation in cross section of an alternative embodiment of a cable produced in accordance with the instant invention.

In accordance with this invention, a method and apparatus for assembling an optical fiber communication cable are provided. The instant method of assembly makes use of known tube forming techniques to permit assembly of a cable having a tubular core construction with a relatively small diameter and a relatively long uninterrupted length. The cable produced by the instant method and apparatus should satisfy all electrical, physical, and operational constraints for both underground and undersea uses for powering multiple loads.

Furthermore, the instant method and apparatus permit production of a relatively small diameter cable having a core exhibiting excellent strength and flexibility characteristics. The cable produced by the instant method and apparatus may have a diameter substantially about one-quarter that of a conventional cable and a transportation volume substantially about one-tenth that of a conventional cable.

The method of assembling the optical fiber communication cable of the instant invention is relatively inexpensive and simple to perform. The instant method readily solves the prior art problem of forming, filling and sealing a tubular cable core construction with negligible risk to the fiber or fibers within the core. It also produces a tubular cable core that is both substantially circular and concentric and that is substantially clean on both its internal and external surfaces before, during and after core fabrication.

Referring now to FIGS. 1-7, an apparatus 10 for forming an optical fiber communication cable 12 in accordance with the instant invention is illustrated. The core of the cable 12 is preferably formed from a strip of composite material 26. The composite material 26 preferably has first and second layers 28 and 30, respectively, of metal or metal alloy separated by a layer 32 of electrically insulating material. The method of achieving a bond between the layers of the composite material is not critical to the instant invention and standard adhesive bonding techniques may be used. Any suitable conventional apparatus 8 may be used to form composite material 26.

Layer 28 preferably comprises an electrically conductive material, such as copper or copper alloy, having an electrical conductivity in excess of 50% IACS. Layer 30 preferably comprises a high strength metal or metal alloy such as aluminum and aluminum alloys, copper and copper alloys and stainless steel. When formed into a tubular construction, layer 30 forms a high strength sheath 31 whose function is primarily one of armoring the cable construction.

Layers 28 and 30 may be formed from either the same material or different materials. The material used for layer 30 should possess certain high strength properties. The material preferably possesses significant yield strength and a relatively high yield strain. The layer 30 should be formed from a material that has a yield strength sufficient to keep the tubular cable core in a substantially elastic state for any degree of cable bending. By having a cable core that is maintained in a substantially elastic state and substantially never in a plastic state, the risk of breaking the glass fiber or fibers due to placing the glass fiber or fibers in tension is minimized. A material having a relatively high yield strain is important since it reduces the overall cable diameter. The material forming layer 30 should have a yield strain of at least about 0.4%, preferably from about 0.75% to about 1%, per inch of length.

The material used for layer 30 should also be capable of sustaining certain coiling forces during fabrication and installation. Therefore, a thickness to diameter ratio K which indicates good formability characteristics is required. If the material does not possess good formability characteristics, a wall of the sheath 31 may be crinkled or buckled during core formation. If this occurs on the inner surface of the sheath, optical fiber or fibers 50 may suffer microbending against angular surfaces and large increases in attenuation may result.

Since during fabrication the composite material is pulled through a fluxing station, a forming die and a sizing die, a slightly harder material is desirable for layer 30 in order to avoid strip breakage.

A suitable material which can be used for the layer 28 is copper alloy C15100. Copper alloy C15100 has a conductivity of about 95% IACS. If desired, copper alloy C15100 could also be used to form strength layer 30. Copper alloy C15100 has a yield strength of about 62 ksi, a yield strain of about 0.0034 and a thickness to diameter ratio of about 0.15 and can be hardened to meet the necessary hardness requirements. Copper alloy C15100 is particularly suitable for situations where at least one additional layer is to be fabricated about the cable core using high temperature fabrication techniques.

Insulating layer 32 is primarily intended to electrically insulate the layer 28 from the layer 30. Any suitable electrically non-conductive material having good ductility properties may be used for insulating layer 32. The material forming layer 32 should have sufficient flexibility that it can be formed into a tubular construction. In a preferred construction, a polyimide material, such as KAPTON, is used for insulating layer 32 on account of its resistance to moderately elevated temperatures. For example, an acrylic type polyimide that is capable of being put on in roll form may be used for layer 32. Alternatively, any suitable synthetic resin polymer known in the art such as TEFLON, any suitable acrylic material known in the art or any other suitable flexible, electrically insulating material known in the art may be used for layer 32 as long as the selected material can withstand the temperatures associated with the process used to seal the core.

Prior to being formed into a tubular cable core, composite material 26 is passed through an apparatus 14 for segmenting the layer 28 into a plurality of discrete, longitudinally-extending conductors 34. The thickness, width, spacing, and longitudinal extent of the conductors 34 are dependent upon the number of conductors required for the intended use and upon the current carrying capacity of the conductors. Higher currents require wider and/or thicker conductors. The cross-sectional shape of the conductors should be either substantially flat and rectangular or substantially trapezoidal not shown with the base of the trapezoid adjacent the layer 32. These cross-sectional shapes readily lend themselves to formation of compact tubular core constructions. In lieu of the above-noted shapes, conductors 34 may have any other suitable cross-sectional shape which will permit formation of a compact tubular core.

Segmenting apparatus 14 may comprise any suitable apparatus known in the art. For example, any suitable milling, scarfing, or skiving apparatus may be used. A particular type of segmenting apparatus that may be used is the multiple gauge strip producing apparatus shown in U.S. Pat. Nos. 3,992,977, 4,037,445, 4,147,089 and 4,147,090 all to Winter et al.

The segmenting apparatus 14 may be omitted if composite material 26 is formed by bonding layer 30 to one surface of insulating layer 32 and thereafter bonding separate strips of shaped electrically conductive material to a second surface of insulating layer 32 opposed to the first surface. The strips of electrically conductive material form the electrical conductors 34. Any suitable conventional apparatus and technique may be used to bond the strips of electrically conductive material to the insulating layer.

Depending upon the manner in which the tubular cable core is to be sealed after it has been formed, one or more of the edge portions 36 and 38 of the respective layers 30 and 32 may be plated. For example, if it is desired to seal the core by joining together opposed ones of edge portions 36 and 38, then both edge portions 36 and 38 should be plated. To achieve maximum solderability, edge portions 36 and 38 are preferably plated with copper. The apparatus 16 for plating edge portions 36 and 38 preferably comprises an electroless plating system. Any conventional electroless plating system as are known in the art may be used for apparatus 16. An electroless plating system may also be used where it is desired to have the solder used to seal the core 40 form an electrical connection between one or more of the conductors 34 and sheath 31.

Alternatively, if it is desired to solder together only opposed edge portions 36 of high strength layer 30, edges 36 may or may not be plated depending upon the material forming high strength layer 30. The edges 36 may be coated with any suitable material such as copper and copper alloys, nickel and nickel alloys or silver and silver alloys. Any conventional plating apparatus as are known in the art may be used to plate edges 36. If no plating of the edges 36 and 38 is to taken place, plating apparatus 16 may be omitted. For example, if opposed edges 36 and 38 are to be sealed together using non-metallic joining techniques, such as epoxies or other similar adhesives, there should be no need for plating apparatus 16.

Tubular cable core 40 is formed by pulling composite material 26 in strip form through forming die 18. The use of a die to form a tube from strip material is well known in the art. *Manufacturing Processes*, Sixth Edition, by Myron L. Begeman et al., John Wiley and Sons, Inc., 1957, pp. 283-285, discloses various dies for forming a tube out of strip material. Any suitable die arrangement may be utilized. However, prior to passing through die 18, the composite material strip is passed through a fluxing station 15. Fluxing station 15 applies a flux to the edges of the strip. Fluxing station 15 may comprise any conventional means for applying any conventional flux known in the art. Preferably, the tubular cable core construction 40 is formed with a seam 41 facing downwardly and the edges of the strip square and tight. Any suitable means such as take-up reel not shown may be used for pulling the strip of composite material through fluxing station 15 and die 18.

The strip of composite material 26 which is used to form tubular cable core 40 preferably has an initial width greater than the outside circumference of the tube formed by forming due arrangement 18. The initial width is about 5% to about 15%, preferably about 10%, greater than the tube outside circumference. By starting with such an initial strip, the seam 41 created during tube forming will be put into significant compression, thereby remaining substantially closed even if spring back occurs. If it is desired to form a mechanical interlock joint, the edges 36 and 38 may be shaped in any suitable manner so that a mechanical seal is formed along seam 41 during tube forming. As a result of using a strip having a width greater than the outside circumference, the core 40 undergoes a tensile elongation during fabrication.

As illustrated in FIGS. 8 and 9, composite material 26 may be formed into a tubular cable core construction having conductors 34 disposed radially around either the inner portion of the sheath 31 or the outer portion of the sheath 31.

After the tubular cable core 40 has been formed by the die 18, it is passed to a station 20 for sealing the seam 41. Station 20 may comprise any suitable sealing mechanism, i.e. soldering means, welding means, brazing means, etc. In a preferred arrangement, station 20 comprises means for soldering the seam 41.

The manner in which the seam 41 is soldered is preferably the same as that described and shown in co-pending U.S. patent application Ser. No. 324,242, filed Nov. 23, 1981 to Winter et al., not abandoned which is hereby incorporated by reference. A supply of solder is provided in sump 44 and fed to soldering head 46 having orifice 47. The core 40 and seam 41 are passed over the soldering head and solder capillaries up into and fills the seam 41. After the solder solidifies, core 40 is completely sealed. Any suitable solder including silver solders, high-temperature solders, low-temperature solders such as lead-tin solder, lead-antimony solder, tin-antimony solder, etc., may be used to seal seam 41 and tubular cable core 40.

After passing over soldering head 46, tubular cable core 40 passes over a wiping device 48 for removing any excess solder. Wiping device 48 may comprise a spring wipe or any other suitable wiping mechanism.

After the solder has solidified and the tubular cable core 40 has been sealed, at least one optical fiber 50 and a cushioning material 52 are inserted into the tubular cable core. In a preferred embodiment of the instant invention, the cushioning material 52 is injected into the tubular cable core 40 just upstream of the point of insertion of the at least one optical fiber 50 into the tubular cable core.

A first embodiment of an apparatus 22 for inserting the at least one optical fiber 50 and the cushioning material 52 into the tubular cable core 40 comprises a first chamber or passageway 54 through which the optical fiber or fibers 50 pass and a concentric second chamber or passageway 56 for inserting the cushioning material 52. Chamber or passageway 54 has a pressure seal 58 with an inlet opening 60 at a first end. The optical fiber or fibers 50 enter the passageway 54 through the opening 60. At the opposite end of passageway 54 is an outlet opening 62. Passageway 54 and outlet 62 guide the optical fiber or fibers 50 and deposit the fiber or fibers 50 into the tubular cable core 40 preferably after the solder has solidified and the tubular cable core has been sealed. In this manner, the risk of damage to the fiber or fibers as a result of the sealing operation is minimized.

In a preferred method of assembling the optical fiber communication cable of the instant invention, fiber or fibers 50 are inserted into the tubular cable core 40 downstream of the location where the cushioning material 52 has been injected into the tubular cable core 40. Although any suitable technique may be used, fiber or fibers 50 are preferably deposited into tubular cable core 40 by pulling the fiber or fibers from one end by any suitable means not shown in any suitable manner without applying substantially any back tension. Since each fiber 50 remains unconstrained until it contacts cushioning material 52, each fiber is under substantially zero tension at the same time that the tubular cable core, as a result of the core formation process, is near maximum elastic tension. By doing this, it is possible to put each fiber in static compression after unloading so that an increment of plastic strain in the sheathing equal to the net static compression could be imposed without kinking the fiber or fibers 50.

In a preferred embodiment, the chamber or passageway 56 for inserting cushioning material 52 into the tubular cable core concentrically surrounds the passageway 54. The cushioning material 52 enters the passageway 56 through an inlet opening 64, preferably while under pressure. The passageway 56 has an outlet opening or exit nozzle 66 through which the cushioning material 52 flows into the tubular cable core. Passageway 56 extends a distance sufficient to insure that the cushioning material 52 does not flow into the tubular cable core until after the solder has solidified. By waiting until after the solder has solidified and the tubular cable core 40 has been sealed to inject cushioning material 52 into the tubular cable core 40, any risk of the cushioning material adversely affecting the sealing operation or vice-versa is minimized and an improved seal may be effected.

The cushioning material 52 is preferably introduced into passageway 56 under pressure so that as the cushioning material 52 flows into tubular cable core 40, it substantially fills the tubular cable core 40 and substantially surrounds the optical fiber or fibers 50. Cushioning material 52 helps position the fiber or fibers 50 within tubular cable core 40. Any suitable mechanism not shown can be used to supply the cushioning material 52 under pressure to passageway 56. The cushioning material 52 is in part caused to flow through opening 66 by the motion of tubular cable core 40 and fiber or fibers 50. The movement of tubular cable core 40 and fiber or fibers 50 in the direction of arrow A creates a suction force on the cushioning material 52. This suction force helps draw the cushioning material 52 through opening 66 and into tubular cable core 40.

Although the cushioning material 52 may be introduced into passageway 56 in substantially any form and at substantially any desired temperature, it has been found to be desirable to insert the cushioning material 52 into the passageway 56 in a heated condition. This heated condition improves the flowability of the cushioning material 56 by making the cushioning material more fluid. Any suitable conventional heating device not shown may be used to heat the cushioning material 52 either before or after it enters the passageway 56.

In a preferred embodiment of the apparatus 22, passageways 54 and 56 are not coextensive. Preferably, the outlets 62 and 66 are arranged so that the cushioning material 52 enters the tubular cable core 40 upstream of the location where the insertion of the optical fiber or fibers 50 into the tubular cable core takes place.

If necessary, tubular cable core 40 may be passed through a die 68 for sizing the tubular cable core 40 to an exact desired dimension. Sizing die 68 preferably comprises a sinking die. If a sizing die is utilized, the optical fiber or fibers 50 are preferably inserted into the tubular cable core just prior to or simultaneous with the tubular cable core passing through the sizing die 68.

By inserting the cushioning material 52 and the fiber or fibers 50 in the manner previously described, it is believed that the magnitude of the forces required to insert the cushioning material 52 and the fiber or fibers 50 into tubular cable core 40 may be reduced. By reducing these forces, the likelihood of damaging or kinking the optical fiber or fibers 18 during insertion is minimized.

In FIG. 6, an alternative embodiment of an apparatus 22' for assembling the cable core 40 is shown. As in the embodiment of FIGS. 4 and 5, a strip of composite material 26 is pulled through a fluxing station 15 for applying a flux to the strip edges and then through a die 18 for forming the tubular cable core 40. The tubular cable core 40 is then passed over a station 20 for sealing the seam 41.

After the tubular cable core has been sealed and the sealing material, i.e. solder, has solidified, the cushioning material 52 and the fiber or fibers 50 are inserted substantially simultaneously by the apparatus 22'. The apparatus >' preferably comprises a single passageway 86 having a pressure seal 82 with an inlet opening 84 at a first end. The optical fiber or fibers 50 enter the passageway 86 through the opening 84. On a sidewall of the passageway 86, preferably adjacent the seal 82, an inlet opening 87 is provided for supplying cushioning material 52 into the passageway 86. In a preferred arrangement, the pressure seal 82 and the inlet opening 87 are at a substantially right angle to each other. At the end of the passageway 86 opposed from pressure seal 82, an outlet opening 88 is provided.

The passageway 86 extends a sufficient distance into the tubular cable core that the fiber or fibers 50 and the cushioning material 52 are deposited into the tubular cable core 40 after the solder has solidified and the tubular cable core 40 has been completely sealed.

While any suitable technique may be used, fiber or fibers 50 are preferably deposited into tubular cable core 40 as before by pulling the fiber or fibers 50 from one end by any suitable means not shown in any suitable manner without substantially any back tension. The cushioning material 52 is preferably inserted into passageway 86 while under pressure so that it substantially fills the tubular cable core 40 and substantially surrounds the optical fiber or fibers 50. The cushioning material 52 is also preferably inserted into passageway 86 in a heated condition so that the flowability of the cushioning material 52 is improved. It is desirable that the flowability of the cushioning material 52 be improved because while the fiber or fibers 50 move at substantially the same speed as the tubular cable core 40, the cushioning material 52 needs to flow at a greater speed since it has to fill the tubular conductor. The cushioning material 52 is in part caused to flow through the opening 86 by a suction force created by the motion of tubular cable core 40 and fiber or fibers 50.

If a sizing die 68 need be used, outlet opening 88 is preferably located substantially near the location of the sizing die. Again, sizing die 68 preferably comprises a sinking die. By positioning the outlet opening 88 at this location, it is believed that the magnitude of the forces required to insert the cushioning material 52 and the fiber or fibers 50 into tubular cable core 40 may be reduced.

Cable core 40 may contain any desired number of optical fibers 50. In a preferred embodiment, it contains from one to six optical fibers. Preferably, each optical fiber 50 comprises a photoconductor glass rod; however, any suitable optical fiber may be used in the cable.

Cushioning material 52 may comprise any suitable non-setting void filler. The temperature to which the cushioning material is heated depends upon the selected filler and its viscosity characteristics. When electric conductors 34 are located radially inwardly from sheath 31, as shown in FIG. 8, cushioning material 52 should be a dielectric filler material such as the insulating type filler materials standardly used in conjunction with transformers and/or capacitors.

After cable core 40 has been assembled utilizing either apparatus 22 or 22', the cable may be surrounded by one or more additional layers. When the cable core is formed so that the electrical conductors 34 are located outwardly of sheath 31, a layer of electrical insulation material or dielectric layer 70 must surround the cable core.

Any suitable conventional apparatus 24 may be used to surround the cable core 40 with one or more additional layers. For example, a dielectric layer 70 may be extruded around cable core 40 by any suitable extruding arrangement 72 in a conventional manner. The dielectric layer 70 preferably comprises a high density polyethylene, although any suitable material may be used. The dielectric layer preferably takes no direct part in the system telemetry and acts only as an insulator. However, if desired, it may be designed to take part in the system telemetry.

If desired, the dielectric layer may be surrounded by a loadbearing or armor layer 78. This layer serves as a tensile element and as an abrasion-resistant layer. In a preferred embodiment, the layer 78 comprises a contrahelix of KEVLAR filaments contained in a matrix of thermosetting epoxy. The fabrication of this layer may be done in a known manner by any suitable fabrication device 74, i.e. fabricating an annulus utilizing a die arrangement. Alternatively, the layer 78 may comprise high strength stranded steel wire not shown or high density polyethylene containing metallic or non-metallic wires not shown.

Preferably, the cable 12 is provided with an outer cover 80. The outer covering 80 serves as a barrier to water intrusion and defocuses external cutting or abrading forces. The outer covering 80 comprises any suitable material such as an elastomeric layer. The outer covering 80 may be extruded over the cable core 40 in any conventional manner by any conventional extrusion mechanism 76. In a preferred embodiment, covering 80 comprises a layer of black polyurethane.

FIG. 8 shows a first embodiment of a cable 12 assembled in accordance with the instant invention. The cable 12 has electrical conductors 34 located radially inwardly of sheath 31.

FIG. 9 shows an alternative embodiment of a cable 12' assembled in accordance with the instant invention. The cable 12' has electrical conductors 34 located radially outwardly of sheath 31.

The optical fiber communication cable generated by the instant invention theoretically can have a substantially infinite length. Cable lengths of about 25 km. between repeaters can be fabricated by the instant method and apparatus.

The optical fiber communication cable assembled by the instant invention may have any size diameter; however, the instant invention is particularly suited for assembling a cable having a relatively small diameter. The tubular cable core 40 may have any desired inside and outside diameters.

Assembling an optical fiber communication cable in accordance with the method of the instant invention has several advantages. First, both the optical fiber or fibers and the cushioning material can be inserted into the tubular cable core in a manner that reduces the likelihood of breaking, kinking, or damaging the optical fiber or fibers. Second, the tubular cable core can be formed with an effective seal providing a high degree of hermeticity. Third, the tubular cable core can be formed so that it has a relatively small diameter, thereby reducing the overall cable diameter.

The cable produced by the instant invention can be used in both underground and undersea communication applications. For example, it could be used to supply data support and power to a deep sea sensor. It could also be used for underground and undersea telephone applications.

While any suitable solder may be used to seal tubular cable core 40, it has been found that when a fabrication technique for forming one or more of the additional layers about cable core 40 uses high temperatures, it is desirable to use a high temperature solder.

While the mechanism for sealing the tubular cable core has been described in terms of a particular soldering operation, any suitable soldering, brazing or welding technique may be used.

While the apparatus 22 for injecting the cushioning material and inserting the fiber or fibers into the tubular cable core has been shown as having concentric passageways with different lengths, the apparatus 22 may be modified so that the concentric passageways have substantially the same length and substantially simultaneously inject the cushioning material and insert the fiber or fibers into the tubular cable core. In addition, the apparatus 22 may be modified if desired so that the passageways are not concentric. Furthermore, the passageway 86 and the passageways 20 and 32 may have any desired cross-sectional shape and any desired longitudinal configuration.

While the optical fiber communication cable embodiments are shown as having a dielectric layer, a loadbearing layer and an outer covering, any number of protective layers may be fabricated about the tubular cable core. For example, in the embodiment of FIG. 8, the dielectric layer 76 is optional. Furthermore, the loadbearing layer 78 may be omitted.

While sheath 31 has been described as being primarily for armoring, it may also be used as an electrical conductor or as a ground if it is electrically isolated. The publications, papers, and U.S. patents and patent applications are intended to be incorporated by reference herein.

It is apparent that there has been provided with this invention a novel method and apparatus for assembling a compact multi-conductor optical fiber communication cable which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. An optical fiber communication cable, said cable comprising:
   at least one optical fiber;
   a tubular cable core surrounding said at least one optical fiber and being radially spaced therefrom; and
   said tubular cable core being formed from a composite material having a first layer of high strength metallic material, a second layer of electrically insulating material bonded to said first layer and at least two electrical conductors bonded to said second layer.

2. The cable of claim 1 further comprising:
   cushioning material surrounding said at least one optical fiber.

3. The cable of claim 2 wherein:
   said cushioning material comprises a dielectric filler material.

4. The cable of claim 1 further comprising:
   said electrical conductors each being formed from a metallic material having an electrical conductivity in excess of 50% IACS.

5. The cable of claim 1 further comprising:
   said first layer comprising a tubular sheath; and
   said electrical conductors being spaced radially outwardly of said sheath.

6. The cable of claim 1 further comprising:
   said first layer comprising a tubular sheath; and
   said electrical conductors being spaced radially inwardly of said sheath.

7. The cable of claim 1 further comprising:
   a dielectric layer surrounding said tubular cable core;
   a loadbearing layer around said dielectric layer; and
   an outer covering surrounding said loadbearing layer.

8. A method of assembling an optical fiber communication cable, said method comprising:
   providing a strip of composite material comprising a first layer of high strength metallic material, a second layer of electrical insulating material bonded to said first layer and a plurality of electrical conductors bonded to said second layer; and
   forming a tubular cable core for housing at least one optical fiber from said strip of composite material.

9. The method of claim 8 wherein:
   said core forming step comprises forming a seam; and
   sealing said seam to form a sealed tubular cable core.

10. The method of claim 9 further comprising:
    inserting said at least one optical fiber into said sealed tubular cable core after said sealing step has been completed.

11. The method of claim 10 further comprising:
    injecting a cushioning material into said sealed tubular cable core after said sealing step has been completed.

12. The method of claim 11 wherein said cushioning material injecting step comprises:
    injecting a dielectric filler into said sealed tubular cable core.

13. The method of claim 1 wherein said composite material providing step further comprises:
    bonding said first layer to a first surface of said second layer;
    bonding a third layer of electrically conductive material to a second surface of said second layer opposed to said first surface; and
    longitudinally segmenting said third layer to form said electrical conductors.

14. The method of claim 1 wherein said composite material providing step comprises:
    bonding said first layer to a first surface of said second layer; and
    bonding a plurality of strips of electrically conductive material to a second surface of said second layer opposed to said first surface so as to form said plurality of electrical conductors.

15. The method of claim 14 wherein said step of bonding said electrically conductive material to said second surface comprises:
    bonding a metallic material having an electrical conductivity in excess of 50% IACS to said second surface.

16. The method of claim 13 wherein said step of bonding said electrically conductive material to said second surface comprises:
    bonding a metallic material having an electrical conductivity in excess of 50% IACS to said second surface.

17. The method of claim 1 further comprising:
    plating portions of said composite material prior to said cable core forming step to improve the solderability of said composite material.

18. The method of claim 17 wherein said plating step comprises:
    electrolessly plating said portions with a material consisting essentially of copper.

19. The method of claim 1 wherein said step of forming said tubular cable core comprises:
    forming said cable core so that said first layer comprises a tubular sheath and said plurality of conductors are located radially outwardly of said tubular sheath.

20. The method of claim 1 wherein said step of forming said tubular cable core comprises:
    forming said cable core so that said first layer comprises a tubular sheath and said plurality of conductors are located radially inwardly of said tubular sheath.

21. The method of claim 1 further comprising:
    extruding a dielectric layer around said tubular cable core;
    fabricating a loadbearing layer around said dielectric layer; and
    extruding an outer covering around said loadbearing layer.

22. An apparatus for assembling an optical fiber communication cable, said apparatus comprising:
    means for assembling a strip of composite material comprising a first layer of high strength metallic material, a second layer of electrical insulating material bonded to said first layer and a plurality of electrical conductors bonded to said second layer; and
    means for forming a tubular cable core for housing at least one optical fiber from said strip of composite material.

23. The apparatus of claim 22 further comprising:
    said core having a seam; and means for sealing said seam so as to form a sealed tubular cable core.

24. The apparatus of claim 12 further comprising:
means for inserting said at least one optical fiber into said sealed tubular cable core after said seam has been completely sealed.

25. The apparatus of claim 24 further comprising:
means for injecting a cushioning material into said sealed tubular cable core after said seam has been completely sealed.

26. The apparatus of claim 22 further comprising:
said assembling means comprising means for segmenting a layer of metallic material having an electrical conductivity in excess of 50% IACS said plurality of electrical conductors.

27. The apparatus of claim 22 further comprising:
said assembling means comprising means for bonding a plurality of strips of metallic material having an electrical conductivity in excess of 50% IACS to said second layer to form said plurality of electrical conductors.

28. The apparatus of claim 22 further comprising:
means for plating portions of said composite material to enhance the solderability of said composite material.

29. plating means comprises:
means for electrolessly plating said portions with a material consisting essentially of copper.

30. The apparatus of claim 22 further comprising:
means for extruding a dielectric layer around said tubular cable core;
means for fabricating a loadbearing layer around said dielectric layer; and
means for extruding an outer covering around said loadbearing layer.

* * * * *